(12) United States Patent
Zelezny

(10) Patent No.: US 7,726,957 B2
(45) Date of Patent: Jun. 1, 2010

(54) ROTATING PISTON MACHINE WITH DUAL SUSPENSION

(76) Inventor: Eduard Zelezny, M. Cibulkovo 9, 140 00 Praha 4 (CZ)

(*) Notice: Subject to any disclaimer, the term of this patent is extended or adjusted under 35 U.S.C. 154(b) by 777 days.

(21) Appl. No.: 10/551,785

(22) PCT Filed: Mar. 25, 2004

(86) PCT No.: PCT/CZ2004/000016

§ 371 (c)(1),
(2), (4) Date: Oct. 30, 2006

(87) PCT Pub. No.: WO2004/088093

PCT Pub. Date: Oct. 14, 2004

(65) Prior Publication Data

US 2007/0128063 A1    Jun. 7, 2007

(30) Foreign Application Priority Data

Apr. 1, 2003    (CZ) .................................. 2003-926

(51) Int. Cl.
*F04C 18/00*    (2006.01)
*F04C 2/00*    (2006.01)

(52) U.S. Cl. ........................................ 418/54; 418/61.1

(58) Field of Classification Search .................... 418/54, 418/60, 61.1, 61.2

See application file for complete search history.

(56) References Cited

U.S. PATENT DOCUMENTS

| | | | | |
|---|---|---|---|---|
| 1,310,157 A | * | 7/1919 | Campo | 418/54 |
| 4,008,988 A | * | 2/1977 | Putz | 418/54 |
| 4,300,874 A | * | 11/1981 | Georgiev | 418/54 |
| 5,295,814 A | * | 3/1994 | Uebel | 418/60 |

* cited by examiner

*Primary Examiner*—Theresa Trieu
(74) *Attorney, Agent, or Firm*—Blank Rome LLP

(57) ABSTRACT

The invention relates to a rotating piston machine, especially a compressor, a pump or a motor, comprising a rotating piston which defines working chambers with variable volumes and is located in a cylinder (1) provided with two lateral walls and a curved jacket. Said piston can be rotated about two parallel rotational axes (7, 8), vertically in relation to the lateral walls of the cylinder, and can be displaced in two directions both vertically in relation to each other and in relation to the parallel rotational axes. To this end, the piston (2) is provided with two guiding shafts (71, 81) having parallel rotational axes, said guiding shafts (71, 81) being provided with guiding elements (5, 6), preferably slides or journals, in a vertical direction in relation to the rotational axes (7, 8), on which the piston (2) is displaceably positioned by means of sliding elements (3, 4), preferably grooves or liners.

6 Claims, 4 Drawing Sheets

US 7,726,957 B2

ROTATING PISTON MACHINE WITH DUAL SUSPENSION

FIELD OF INVENTION

The present invention relates to a machine with the revolving piston, which encloses workspaces with alternately changing volume such as: compressors, pumps, or engines where the piston is arranged inside the cylinder formed by two sidewalls and the curved covering, the curve of which is a geometrical locality of the piston cusps arised during its revolving motion around two revolving axes, whereas a conducting ring embedded on the sidewall or rotary in the sidewall or also in a sliding way against a supporting shaft is connected with the piston embedded on the supporting shaft either in a sliding way normal to its axis or rotary through the supporting eccentric connected to the supporting shaft.

BACKGROUND TO THE INVENTION

There are known arrangements where the piston holds a simple revolving motion. It is eccentrically placed inside the circular covering equipped by the extension seals, which fill changing distances between the piston and the circular covering and concurrently enclose changing workspaces between the piston and the cylinder covering. This arrangement does not tolerate high pressure or temperature therefore it can only be used as a blower. Furthermore, there are known arrangements where the piston holds one compound revolving motion i.e. rolling motion (by rolling a bigger circle, for example the central circle of the inside tooth-wheel, over an immobile smaller circle for example the central circle of the tooth-wheel with an internal gearing, by means of the tooth-wheels). The diameters ratio of both circles quantifies the number of the piston cusps, which follows the same curve and also the same number of workspaces enclosed by the piston. If the ratio is 2:1, the piston has two cusps and encloses two workspaces. If the ratio is 3:2, the piston has three cusps and encloses three workspaces etc. At the higher number than two of the piston cusps, the covering curve has very inconvenient shape for a combustion space and in addition the biggest-the smallest volume ratio of the workspace is principally restricted, which is the disadvantage of this solution. Two cusps arrangement can else provide more convenient combustion space and more convenient the biggest-the smallest workspace ratio, but also principally gives the adverse ratio of piston surface encumbered by work pressure to the biggest possible critical shaft diameter, which the piston is embedded on. This arrangement is therefore not suitable for engines, but only for blowers or pumps and low work pressure compressors.

There is another known concept of the piston with two cusps motion, where both of the cusps follow a curve called conchoid. In this concept, the piston is embedded in a sliding way on two parallel shafts normal to their revolving axes. Herewith, the piston sliding motion toward the individual shafts are mutually perpendicular. One of these shafts acts as a supporting shaft and the other as a conducting shaft; herewith both of them are always embedded just in one sidewall. One of them is adapted in a tubular jig way, which passes through the other shaft, in order to embed both of them into both sidewalls.

According to other known concepts one of the shafts can be replaced by one or by number of pivots protruding from the piston is embedded on, can also be replaced (in other concepts) by the shaft with the crank pivot, which the piston is embedded on, herewith the conducting shaft, as mentioned above, is replaced by the pivots. These conchoid concepts also have common disadvantages such as, insufficient bearing capacity of the supporting shaft and an inaccurate piston guide sensitive to wear. These construction concepts have not therefore been seen and stayed in the conception state even though they have been well known since the beginning of the 20th century,

SUMMARY OF THE INVENTION

The present invention seeks to eliminate the disadvantages of the current state of technology by providing a machine with the revolving piston that is mounted between a sidewall and a curved circumferential wall of a cylinder in (1) a rotating way around two parallel axes of rotation, which are normal to the side walls of the cylinder, and (2) a sliding way in two directions normal to the axes of rotation and to one another. The rotary piston circumscribes in the cylinder workspaces that have periodically varying volume according to the invention. The rotary piston is supported by sliding means on a guide ring pivoted in the sidewall in a rotating way around of the axis of rotation. The guide ring is provided with a bore. A supporting shaft passes through the bore. The rotary piston is further supported on the supporting shaft for sliding movement normal to the axis of the supporting shaft or in a rotating way on a supporting eccentric member connected with the supporting shaft. Advantageously, the rotating piston can be provided with an inboard sliding element having sliding means for a sliding fit of the rotating piston on the guide ring. Advantageously, the sliding means of the rotating piston can be mutually turned by 90°, and the guide ring can be pivoted in the sidewall in both a rotating and sliding way in a direction normal to the axis of the guide ring. The guide ring can also have an end disinclined from the rotating piston. The end of the guide ring can be provided with a recess that has an additional inner sliding means, the additional inner guiding surface arranged vertically to the guiding surfaces. A guide element may be fitted in a sliding way in the additional inner guiding surface. The guide element can be pivoted in a rotating way in a cylindrical eccentric of the supporting shaft and the cylindrical eccentric and the supporting cylindrical eccentric being mutually turned one to another by 180°. Yet another advantage is that the space of the sliding element created for movement of the guide ring can be connected with vents for entry and outlet of lubricant and/or coolant.

DETAILED DESCRIPTION OF THE DRAWINGS

The present invention can be more readily understood by the Drawings, in which.

DETAILED DESCRIPTION

Figure 1:
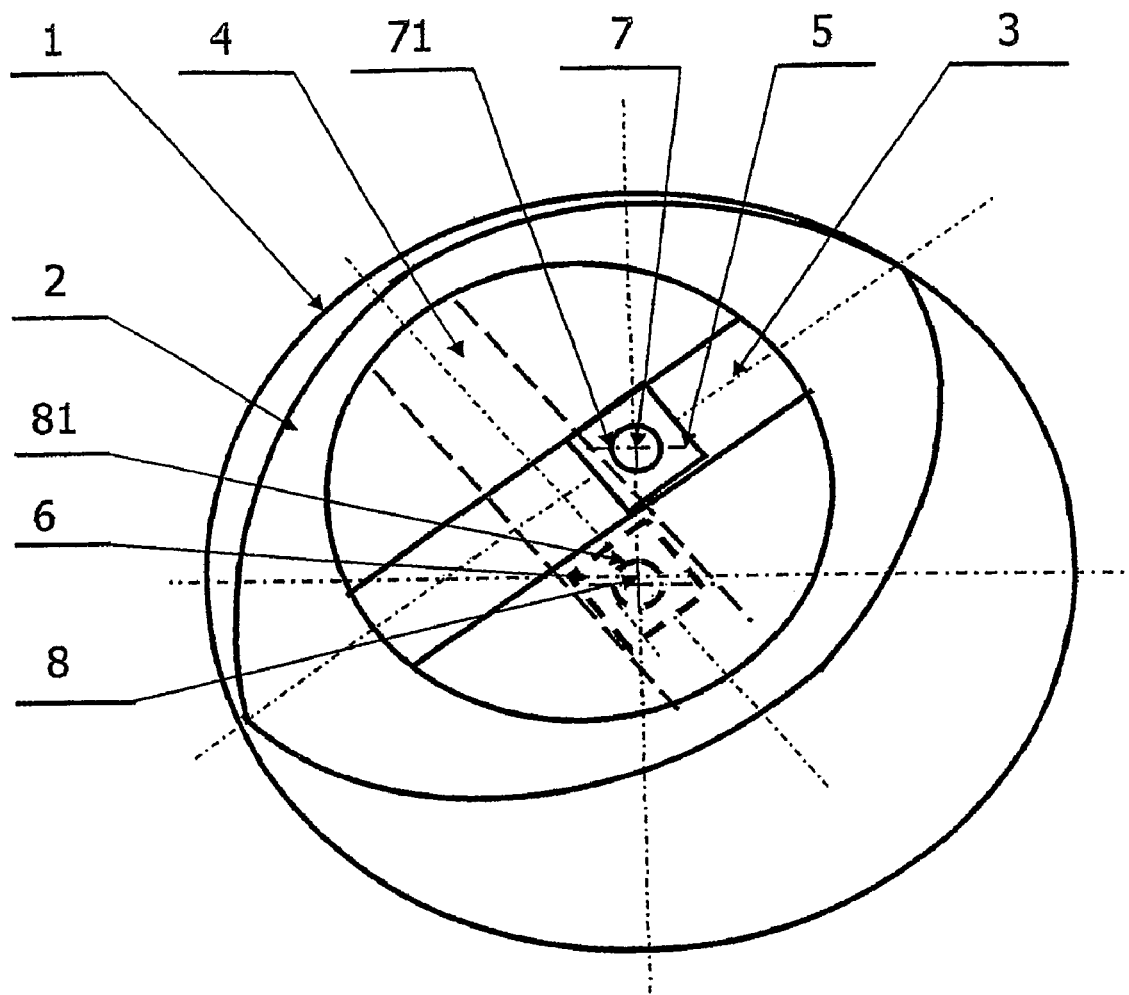
FIG. 1 is a schematic of the present invention.
Figure 2:
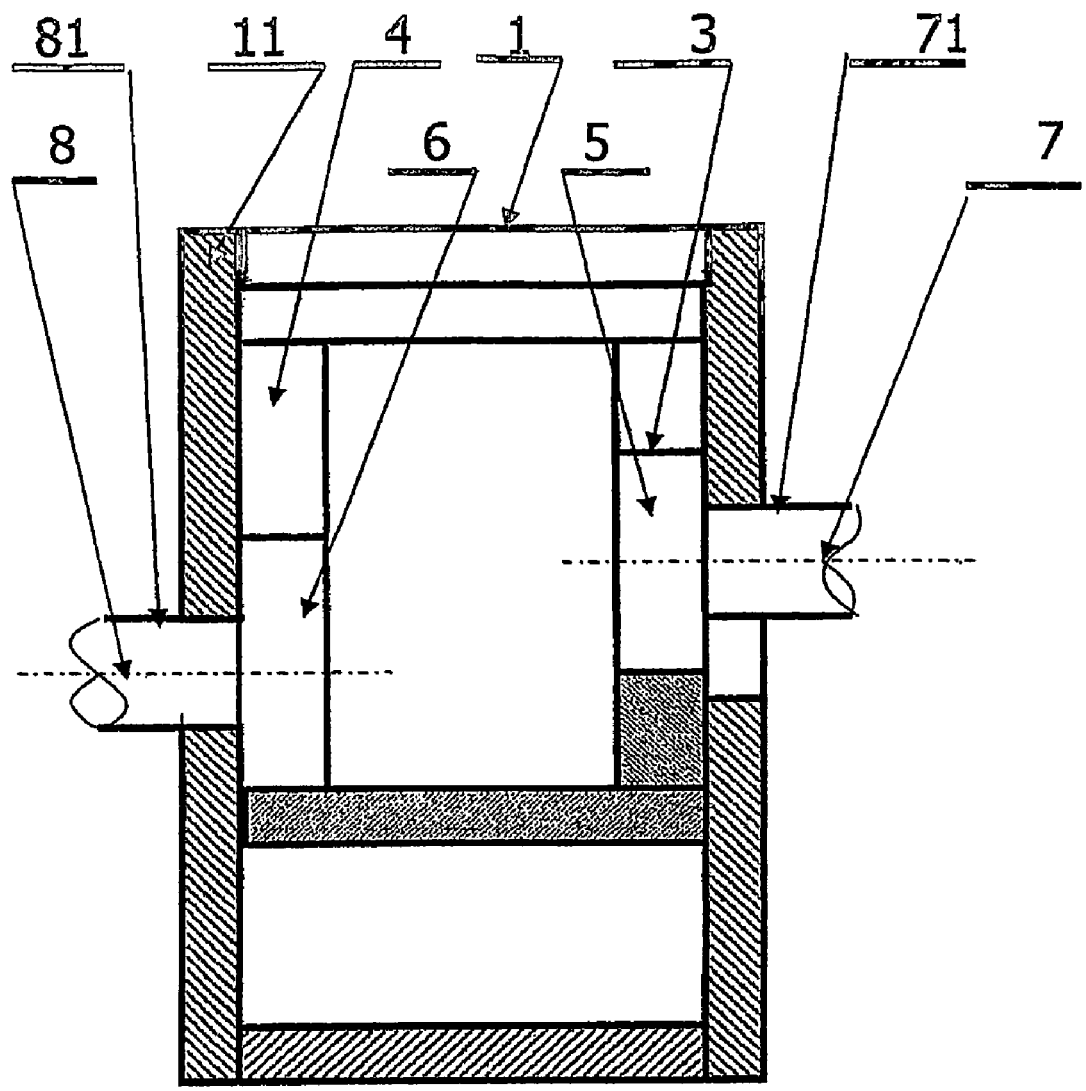
FIG. 2 shows the main aspect of the conchoid design in accordance with the present invention.
Figures 4, 5:
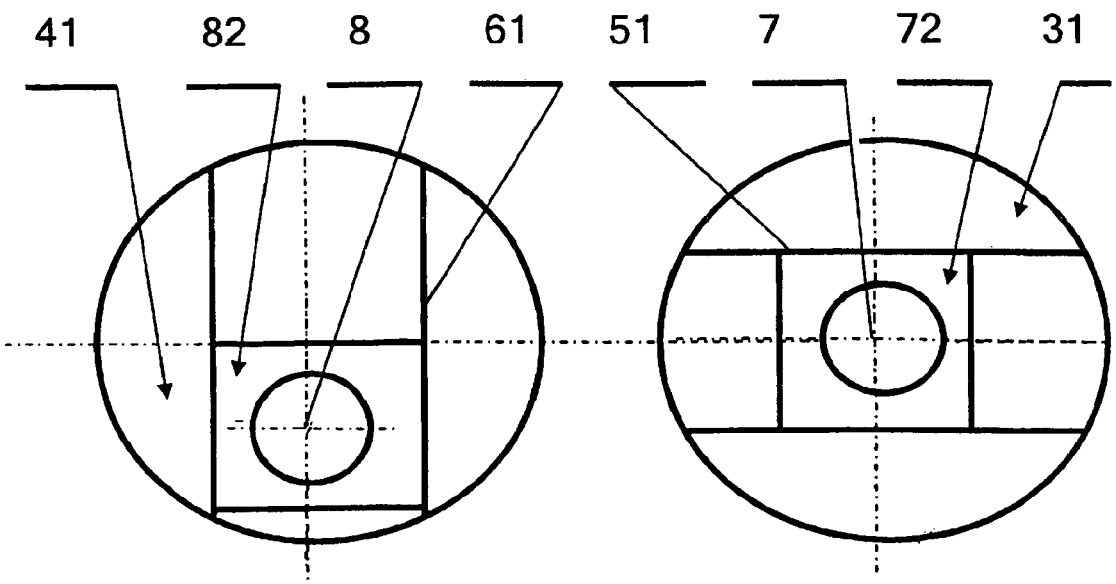
FIG. 4 and FIG. 5 show alternative schematics of the embodiments of the present invention.

In FIG. 1, the piston 2 equipped by the slots 3 and 4, which form the sliding elements of the piston 2 is arranged in the curved casing 1. The slots 3, 4 settle the piston 2 on two sliding means 5, 6, which are always fixed upon one of the shafts 71, 81 whose axes are parallel. According to FIG. 2 the cylinder casing 1 is enclosed by the sidewalls 11, which shafts 71, 81 are rotary embedded on. Arrangements of the sliding elements 3, 4 and the sliding means 5, 6 (at the opposite sides of the piston) and shafts 71, 81 is shown on the FIGS. 4 and 5. During the revolving of the pistons 71, 81, the fixed sliding means 5, 6 (which furthermore revolves the piston through the particular sliding element, e.g. slot) concurrently revolves too. The piston also revolves around the axes 8, 7 through its second sliding element 4, 3, second conducting element 6, 5 and second shaft 81, 71. If the cusps have the same distance from the centre of the piston 2, then both of them follow the same covering curve, which together with connection of both cusps forms two separated spaces.

The concurrent revolving motion of the piston 2 around the parallel axes 7, 8 causes that during motion along the casing 1 one of the joins of the piston 2 and casing 1 departs, while the other join approaches the covering 1. During revolving around 180 degrees, the space between one join of the piston cusp and the casing 1 amplifies from minimum to maximum while the space between the other joins diminishes from maximum to minimum. If the cylinder casing 1 and/or the cylinder sidewalls 11 are equipped at one side by an inlet and at the opposite side by an exhaust of the liquid or fluent medium, then this medium begins by revolving of just one of the shafts expels from the space between the casing 1 and the piston 2 at one side and sucks out of this space at the other side. The machine then works as a compressor or a pump. If the pressure medium is fed through one side of the cylinder into the space between casing 1 and piston 2 then the pressure on the surface restricted by the join of the cusps and width of the piston 2 causes force, which eludes the revolving axis 7 and causes a moment to this axis. This moment revolves the shaft 71 and thereby also revolves the piston 2 and the second shaft 81.

Figure 3:
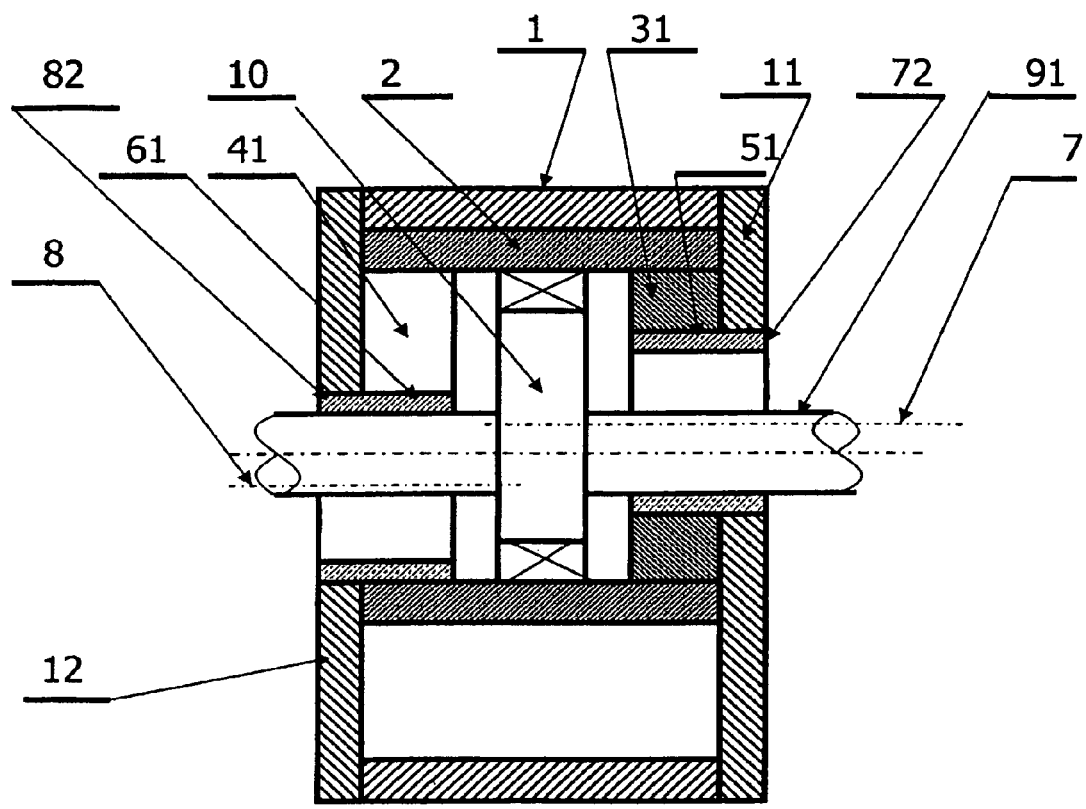
FIG. 3 shows another embodiment of the present invention where the piston is conducted by the conducting rings and is further embedded on the supporting eccentric, which is connected to the supporting shaft.

In one particular embodiment of the present invention, just one of the shafts 71, 81 is used as a supporting element embedded in the sidewalls 11, while the other is replaced by the guide ring 72, 82, which is also rotary embedded in the sidewall 11 and which is also equipped by the sliding means 51, 61 connected to the sliding element 31, 41 in the piston 2. According to another embodiment of the present invention, the piston itself is rotary embedded, for example, through a bearing on the supporting eccentric member 10, which is arranged on the supporting shaft 91 rotary embedded primarily in both of the sidewalls 11. The supporting shaft 91 passes through the guide rings 72, 82 and its axis lies on the plane formed by axes 7, 8 of the guide rings 72, 82 in the middle distance between them. Eccentricity of the supporting eccentric member 10 is equal to the middle distance between axes 7, 8. Within the revolution of the piston 2 conducted by the guide rings 72, 82 the center of the supporting eccentric 10 moves along the same trajectory as the center of the piston 2. Piston 2 loading is then fully transmitted by the supporting eccentric member 10 and by the supporting shaft 91, so the guide rings 72, 82 are not under the load of piston pressure. There can be transmitted high piston pressures according to the embodiment shown in FIG. 3 in accordance with the present invention.

According to the present invention in the firstly described aspect of the guide shaft 71 adapted as a supporting shaft, it is possible to embed the guide ring 72, 82 in the sidewall 11, or on the sidewall 11 and also simultaneously in a sliding way against the guide shaft 71 adapted as a supporting shaft. This sliding design can also be made both on, or in the sidewall 11 and together with this sidewall 11. In this case, the supporting shaft 91 or the supporting eccentric member 10 can not be used. Piston loading is then transmitted by the sufficiently dimensioned and both sides embedded guide shaft 71. By variation of the distance between guide ring 72, 82 axes and the guide shaft 71 made as a supporting shaft, there can be fluently, during a machine run, changed both, the ratio of minimal-maximal space between the cusps join and curved covering (and thereby also the volume of the sucked and compressed medium) and also the magnitude of the moment to the revolving axis 7. With an assemblage of, at least, two in this manner machines according to the present invention can be arranged, for example, one as a pump and a second as an engine powered by fluent or liquid medium, both the ratio of revolutions and the ratio of moments of both together connected machines fluently changes during shifting of the guide ring 72, 82 against the shaft 81.

Figure 6:
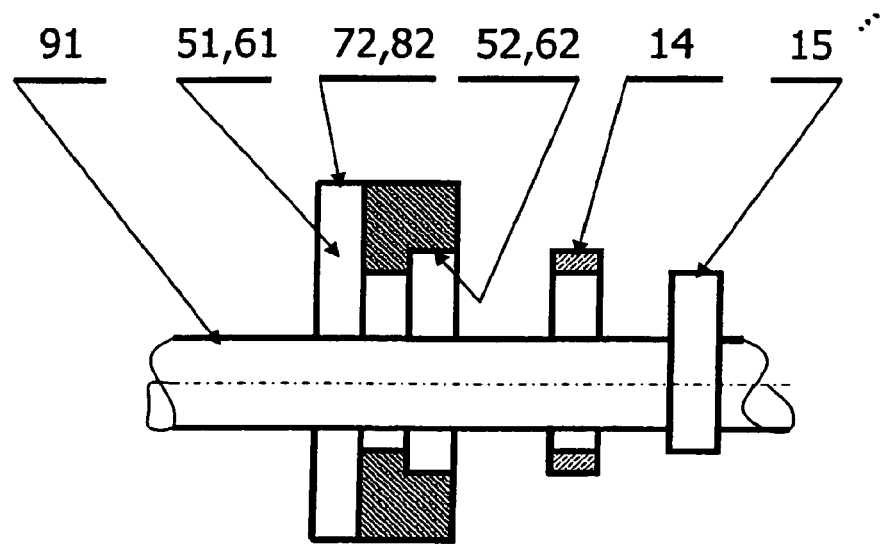
FIG. 6 shows a sectional view of another variation of the present invention.

Regarding the supporting eccentric 10 and the supporting shaft 91, there is, according to the present invention, a connected function of both of the guide rings so that, the guide ring 72, 82 is arranged just at one side of the piston 2 and adapted according to the FIG. 6 so that, aside from the sliding means 51, 61, arranged at the inclined cylinder side, it has, along the disinclined cylinder side, ancillary sliding means 52, 62, which the glide rotary set on the ancillary eccentric 15 is in the sliding way embedded in. This ancillary eccentric 15 has the same eccentricity as the supporting eccentric 10 and it is firmly arranged on the supporting shaft 91, which is rotated by 180° against the supporting eccentric 10. In this way, both the guide rings can be jointed into the one from both of the embedded sites. It is clearly seen that from manufacturing reasons, it is more convenient to place the jointed conducting ring on the place of the guide ring 82 i.e., so the sliding means 61 would be embedded in the sliding element 41 of the piston 2, in a sliding way, perpendicularly to the line joining both of the pistons 2 cusps.

All machines with moving components have many places, which are necessary to lubricate or to cool. With the machine, according to the present invention, it is not necessary to use a separate pump, because it is possible to use, according to the present invention, changing spaces between some mutually moving parts (e.g. between sliding elements 3, 4, 31, 41, or optionally between the glide 14 and sliding means 5, 6, 51, 61, 52, 62 as a pump for a lubricating and/or cooling medium by means of closing these spaces at the sides so that they provide inlet and exhaust vents for the above mentioned medium.) In this manner, not only the usual expensive and heavy pumps can be excluded, but this lubricating, or/and cooling medium can be during pumping inside the machine conducted through places to be cooled, or/and lubricated so that the consumption of these mediums is very small.

The present invention is, both according to the embodiments described above and in comparison to the known piston engines of the prior art, more convenient by its smaller size as compared to engines with sliding pistons, smaller weight and is totally balanceable. It is more powerful and less noisy compared to the toothed machines. The present invention also provides better force transmission and smaller lubricant consumption as compared to machines with the piston rolling by means of gears. The present invention also provides more accurate piston conduction and better force transmission comparing to other conchoidal machines and finally it also provides a possibility to smoothly change maximal volume of the workspace contrary to all other mentioned machines. With the machine, according to the present invention, there is no direct dependence of the piston diameter on the loaded area of the piston, which enables a utilization under high pressure e.g. in the case of combustion engines, or in the case of very high pressure at hydraulic pumps.

The invention claimed is:

1. A machine with a rotary piston mounted between two sidewalls and a curved circumferential wall of a cylinder, the rotary piston being mounted in both a rotating way around two parallel axes of rotation, which are normal to the sidewall of the cylinder, and in a sliding way in two directions normal to the axes of rotation and to one another, wherein > the rotary piston is supported by sliding means on guide rings, the guide rings pivot in the sidewall in a rotating way around the axes of rotation, the guide rings having a bore; and
>
> a supporting shaft passing through the bore of the guide rings, wherein the rotary piston is supported on the supporting shaft for a sliding movement normal to the axes of the supporting shaft or in a rotating way on a supporting eccentric member connected with the supporting shaft.

2. A machine with a rotating piston, according to claim 1, wherein

> the space of the sliding element created for movement of the guiding ring is connected with vents for entry and outlet of lubricant and/or coolant.

3. A machine with a rotating piston, according to claim 1, wherein

> the guide rings have an end disinclined from the rotating piston, the end of the guide rings have a recess with an inner guiding surface, the inner guiding surface being arranged vertically to the sliding means,
>
> whereas a guide element is fitted in a sliding way in the inner guiding surface, the guide element being pivoted in a rotating way in the eccentric member of the supporting shaft, and the eccentric member and the supporting cylindrical eccentric being mutually turned with respect to one another by 180°.

4. A machine with a rotating piston, according to the claim 1, wherein

> the rotating piston is provided with an inboard sliding element having the sliding means for sliding fit of the rotating piston on the guide rings.

5. A machine with a rotating piston, according to claim 1, wherein

> the sliding means having elements that are mutually turned by 90°.

6. A machine with a rotating piston, according to claim 1, wherein

> the guide rings are supported in the sidewall in a rotating way and in sliding way in a direction normal to the axis of the guide ring.

* * * * *